Figure 1:
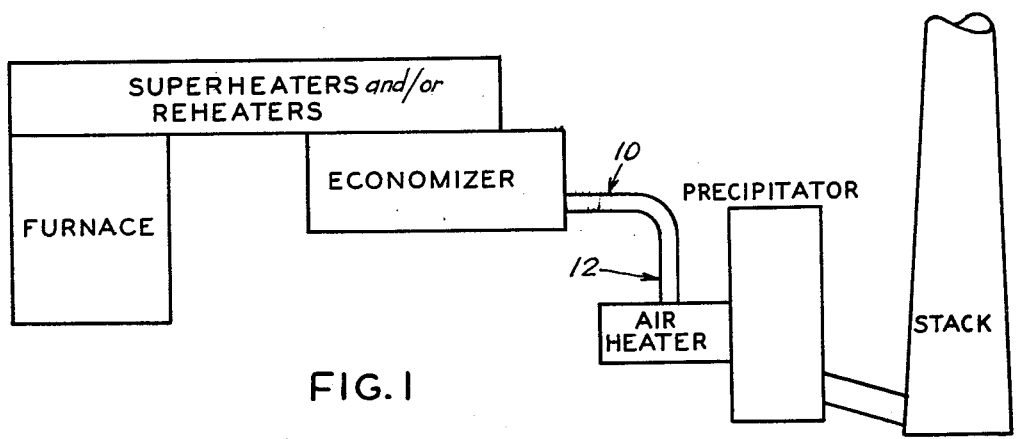

United States Patent [19]

Vossos et al.

[11] 4,100,258
[45] Jul. 11, 1978

[54] SODIUM ALUMINATE TO REDUCE FLUE GAS CORROSION

[75] Inventors: Peter H. Vossos, Lisle; Morris Mindick, Downers Grove; Larry P. Koskan, Orland Park, all of Ill.

[73] Assignee: Nalco Chemical Company, Oak Brook, Ill.

[21] Appl. No.: 677,924

[22] Filed: Apr. 19, 1976

[51] Int. Cl.$^2$ ............................................. C01B 17/00
[52] U.S. Cl. ..................................................... 423/242
[58] Field of Search ................................. 423/242–244

[56] References Cited

U.S. PATENT DOCUMENTS

| 2,434,868 | 1/1948 | Sample et al. | 423/242 X |
| 3,761,570 | 9/1973 | Lowicki | 423/242 |
| 3,886,261 | 5/1975 | Libuti | 423/244 |

OTHER PUBLICATIONS

Bureau of Mines Report 5735, 1961.
Bureau of Mines Report 7275, 1969.

*Primary Examiner*—Earl C. Thomas
*Assistant Examiner*—Gregory A. Heller
*Attorney, Agent, or Firm*—Kinzer, Plyer, Dorn & McEachran

[57] ABSTRACT

$SO_3$ is removed from flue gas by injecting liquid sodium aluminate, achieving essentially complete $SO_3$ removal.

8 Claims, 3 Drawing Figures

SODIUM ALUMINATE TO REDUCE FLUE GAS CORROSION

This invention relates to a method of ridding flue gas of the oxides of sulfur.

The oxides of sulfur entrained in a flue gas, produced from the combustion of fuel oil or coal, are inimical to health and $SO_3$ is a precursor of sulfuric acid which corrodes plant equipment. The problem is extensively explained in U.S. Pat. No. 3,837,820, for example, where the problem is coped with by treating the flue gas with manganese or magnesium, or their compounds. Manganese and magnesium are expensive; manganese in particular is a strategic material in the world market today, amounting to another problem in itself.

According to U.S. Pat. No. 2,992,884, sulfur dioxide ($SO_2$) is removed from flue gas by oxidizing it in the presence of sodium oxide ($Na_2O$), the latter being supported on a bed of a refractory such as chromia or alumina. Sodium oxide is the active material, forming sodium sulfate. Chromia or alumina presumably is nothing more than a support in the fluidized bed disclosed as the only mode for effectively contacting the flue gas. The absorber, which may contain elemental sulfur and other contaminants, is subsequently reacted with a reducer gas to form $H_2S$ from which the sulfur is subsequently extracted. In this manner, the absorber may be regenerated but at the cost of an additional plant facility to regenerate the absorber. Also, the fluidized bed undergoes constant attrition, as is well known, and the resultant "fines" will both settle out and be swept up the stack. The amount lost indeed may be a significant fraction of the stoichiometric quantity required in the first place, so the amount of absorber employed has to be a multiple of the amount actually required. It is stated in the patent that small concentrations of $SO_3$ and sulfuric acid are readily absorbed at the same time.

According to U.S. Pat. No. 3,886,261, sulfur trioxide in flue gas is treated with alumina in particulate form as the active material, rather than sodium oxide as an active material. Apparently the preferred mode of treatment is to introduce the alumina particles into the flue gas by means of a vibratory hopper "to assure that discrete particles are fed." Subsequently, where there is less turbulence, those particles of alumina would presumably "deposit on the surfaces of the metallic structures . . . in the cold end" where they would account for "adsorption of the sulfur trioxide . . . (and permit) a reaction for the formation of the relatively harmless aluminum sulfate." It was also reported "the dew point temperature for the sulfur trioxide is lowered substantially . . . yielding less deposition of sulfuric acid and correspondingly less corrosion of the metal parts."

The inventor identified in U.S. Pat. No. 3,886,261 presented additional information at an ACS meeting in April 1976 saying additions such as "alkaline solids were injected upstream of the air heaters to try to neutralize $SO_3$ but had no effect on the flue gas sulfur oxide concentrations . . ." Indeed, the indication was "that protection was resulting from coating the probe surface with additive rather than from reacting with the bulk of the sulfur trioxide."

One of the additives reported was "coarse" sodium aluminate but this material resulted in "spotty" coverage of the surfaces to be protected. One of the preferred materials was apparently a mixture of $Al_2O_3/SiO_2$ fed at a rate of 9.2 pounds/hr; the dew point was reduced from 270° to 255° F, meaning of course that not all the $SO_3$ had been removed even at the highest feed rate which, incidentally, is far in excess of the requirements of the present invention.

The object of the present invention is to effectively remove sulfur trioxide (sulfuric acid) from flue gas by injecting the flue gas containing sulfur trioxide with liquid sodium aluminate, requiring no alteration in plant equipment and, once into the stream of flue gas, resulting in fast neutralization of $SO_3$ approaching the theoretical limit of zero, compared to the prior art discussed above.

Another object of the invention is to enable results to be varied by selective dilution of the liquid sodium aluminate to be sprayed.

Figure 2:
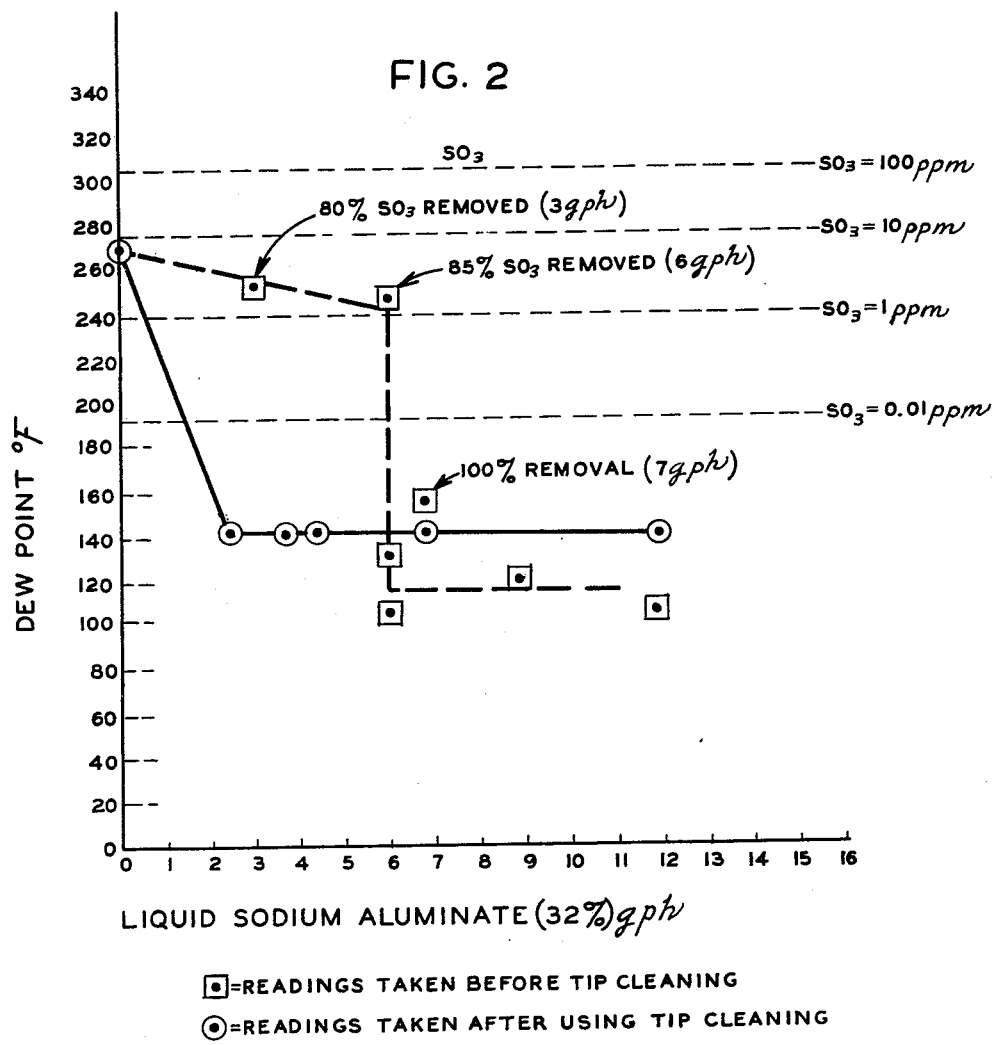
Figure 3:

In the drawing:

FIG. 1 is a schematic drawing of a typical utility boiler installation;

FIG. 2 presents curves of a field test;

FIG. 3 is a microphotograph, 1000×.

Under the present invention, $SO_3$ and/or sulfuric acid is removed from flue gas by spraying the gas with (atomized) liquid sodium aluminate. Dew point measurements establish the treatment is so effective that actual practice is near, if not at, the theoretical level.

A preferred source of an aqueous solution of sodium aluminate is NALCO 2 (Nalco Chemical Company) which is a very stable aqueous form having the following characteristics:

| | |
|---|---|
| Color | Water White to Straw |
| $Na_2O//Al_2O_3$ Ratio | 1.5/1.0 |
| Specific Gravity at 100° F | 1.450 – 1.460 |
| $Al_2O_3$ | 19.9% |
| $Na_2O$ | 18.3% |
| Pour Point | Approx. — 20° F |
| pH of 5% Sol | 12.7 |

| VISCOSITY | |
|---|---|
| 0° F | 14,000 cps |
| 20° F | 2,000 cps |
| 40° F | 280 cps |

A field test was undertaken using the utility boiler of a power plant burning a crude oil estimated as producing 18.7 pounds $SO_3$ per hour.

From the following equation, one mole of pure sodium aluminate can potentially neutralize four moles of $SO_3$:

$$Na_2O.Al_2O_3 + 4SO_3 \rightarrow Na_2SO_4 + Al_2(SO_4)_3$$

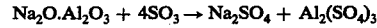

Therefore, the weight of $SO_3$ that can be neutralized by 1 pound of pure sodium aluminate is:

$$4 \times 80,164 = 1.95 \text{ lbs. } SO_3$$

Since the commercial product employed NALCO 2) contains 32% sodium aluminate and has a gravity of 12.0 lbs/gal., one gallon should theoretically neutralize:

$$1.95 \times 12 \times 0.32 = 7.5 \text{ lbs. } SO_3$$

Therefore, to neutralize 18.7 lbs $SO_3$/hr. should require $18.7/7.5 = 2.5$ gph of the commercial product.

The commercial source of sodium aluminate identified above was diluted with water and sprayed into one side of the boiler duct 10, FIG. 1, after (downstream of) the economizer where the temperature was 680° F. This general area is known as the cold end of the boiler. The cold end customarily includes the economizer, air heater, precipitator, stack and connecting ducts.

A dew point probe instrument was inserted at 12, FIG. 1, in the duct just above the air heater inlet. This was about 30 feet downstream of the injection point 10 and about 10 feet ahead of the air heater inlet. FIG. 1 is schematic and no attempt is made to show details of the plant equipment which intervenes between the air heater and the stack, nor does the figure have a scale or direction.

A measurement of dew point was selected as a measure of sulfuric acid content in the flue gas. A base line dew point of 265° F was obtained with two different instruments. This base line corresponds to no treatment at all for removing $SO_3$, that is, maximum sulfuric acid content. The dew point base line was further verified by spraying water alone at area 10, FIG. 1, which produced no effect on the base line dew point or the temperature of the flue gas at the air heater inlet. A dew point of 265° F for the untreated gas corresponds to about ten ppm $SO_3$ as indicated in FIG. 2. A flue gas stripped of $SO_3$ would have a (water only) dew point of 180° F or less.

Feed rates of the product (NALCO 2) were varied from 2.6 to 12 gph and dew points taken throughout the testing period. It was noted that dew point reductions were rapid within 30 minutes of the additive injection. Once the injection of atomized liquid sodium aluminate was terminated, the dew point returned to base line levels within ½ hour.

Referring to FIG. 2, two sets of dew point data were collected. The points used for the dashed curve correspond to readings from a dew point probe in which no effort was made to clean the instrument of accumulated deposits in the course of taking readings. It was deemed those data could have been affected by the deposits, so additional readings were taken by a similar instrument which was periodically cleaned and those dew point readings, FIG. 2, showed that indeed the calculated treatment of about 2.5 gph (NALCO 2) produced a dew point reading showing no $SO_3$.

The initial results (dashed line, FIG. 2) showed that at a dosage rate of seven gph and upwards, there was no doubt that the $SO_3$ was completely neutralized since water dew points were obtained. During the initial testing, feed rates of three gph showed a reduction of the dew point from 265° to 250° F indicating 80% removal of $SO_3$. A six gph feed rate showed a 245° F dew point or 85% removal.

More specifically, it was noted during initial testing that if the dew point thimble at the end of the probe was left in the duct too long without cleaning, a light dusting of salts left on the thimble constituted a conductive layer likely to cause false meter results. Consequently the thimble was cleaned before each determination and the reading was completed within 10 to 15 minutes if possible.

After this change in test procedure, dosage rates of 4.6, 4.0 and 2.6 gph all resulted in dew points well below 250° F. Again, within one-half hour of discontinuing chemical injection, the dew point had increased to the base line of 265° F level.

FIG. 3 is a 1000× magnification of the dry fly ash, so collected during the test as to be certain it would be the separated deposit obtained from neutralizing $SO_3$ with liquid sodium aluminate. The unexpected result was a myriad of thin virtually two-dimensional (not spherical at all) leafy diaphanous material greatly expanded in comparison to the injected droplets. X-ray analysis confirms the presence of sodium, aluminum and sulfur in the diaphanous material.

The unexpected result of an expanded deposit of vast surface area would account for the high efficiency in $SO_3$ neutralization and can be explained as follows. The atomized liquid, injected as a fine spray of discrete droplets, embodies a great deal of water, especially since the commercial product itself was diluted in the test run as will be explained. Those droplets, encountering the hot flue gas, will naturally lose water and indeed the droplets should theoretically burst, exposing immense areas of pure sodium aluminate thereby accounting for the diaphanous appearances, FIG. 3.

The ratio of sodium oxide:alumina ($Na_2O:Al_2O_3$) must be greater than 1.0 to assure a stable solution. The preferred ratio is 1.1 to 1.5 but a ratio up to 3 will be useful and up to 5 is possible. In this connection it may be mentioned that the product contains an excess of about 8% $Na_2O$ so that the actual solids content is about 40% by weight, that is, 32% sodium aluminate and about 8% uncombined $Na_2O$ known as excess alkali. The water phase, as noted, is doubtless responsible for the diaphanous form of the spent material, FIG. 3, and it is likely this material may deposit on equipment at the cold end of the boiler installation, which is incidental and not planned. Be this as it may, the liquid commercial product is easily diluted, allowing viscosity to be reduced for a more effective atomization of very tiny particles, which if attempted with a solid absorbent by grinding could only be achieved at a high cost, a cost which increases exponentially as the particle size diminishes. Solids (commercial product) may be up to 50%.

The dilution water may therefore be viewed as a means enabling an exceedingly fine spray to be realized, meaning more contact per unit volume of flue gas per unit of time. Too much dilution may be detrimental in the sense that water itself would settle on the equipment. In the field test mentioned above it was found a total liquid flow of up to 35–40 gph could be tolerated, achieved by using an air atomizing nozzle operating at 60 psi. The feed rate and amount of dilution, if any, will of course vary depending upon the $SO_3$ content in the particular boiler installation.

Referring to FIG. 3, the following correlations are involved:

| Feed Rate (gph) | Pounds of product (NALCO 2)/pound $SO_3$ |
| --- | --- |
| 3 | 1.9 |
| 6 | 3.8 |
| 7 | 4.4 |

From this can be visualized some of the following practical applications. Utility companies burning fuels with low sulfur content (which is the case of the above field test) may decide to use considerably more than (say up to three times) the theoretical amount simply because the cost to assure total $SO_3$ elimination is worth it. The theoretical amount may be considered 0.5 pounds per sodium aluminate per pound of $SO_3$ (1/1.95; see the above equations). On the other hand, companies burning a fuel say with 100 ppm $SO_3$ will be content to opt for any significant reduction, as low as one-fourth of theoretical or less. Therefore, a useful range may be considered to be injection of liquid sodium aluminate having an $Na_2O:Al_2O_3$ ratio greater than one, in which the amount injected per pound of $SO_3$ varies between 0.05 and 1.5 pounds; and in which the volumetric ratio of (a) undiluted aqueous sodium aluminate solution to (b) an additional amount of water for dilution to induce a finer spray, if need be, to assure expanded surface area exposure for optimum treatment, stands in the proportion of (b):(a) is 0–100, that is, in the range of no dilution water to 100 volumns of dilution water.

Also, by lowering the $SO_3$, fuels with higher sulfur content may be used.

We claim:

1. The method of treating flue gas, delivered to a stack, to remove an entrained sulfur-containing compound selected from the group consisting of oxides of sulfur and sulfuric acid derived from burning the fuel, comprising the step of spraying the flue gas, before it reaches the stack, with droplets of an aqueous solution of sodium aluminate ($Na_2O \cdot Al_2O_3$), the ratio of $Na_2O:Al_2O_3$ being greater than 1 to assure a stabilized solution and in which the sodium aluminate used is in an amount effective to remove at least a significant portion of the sulfur-containing compound by virtue of being converted to the sulfates of sodium and aluminum.

2. The method of claim 1 in which the ratio is in the range of 1.1 – 1.5 and in which the amount of treatment on a dry basis is at least 0.05 pounds sodium aluminate, contained is solution, per pound of entrained compound calculated as $SO_3$.

3. The method of claim 1 applied at the cold end of a boiler installation.

4. The method of claim 1 in which the amount of treatment, per pound of entrained $SO_3$, is in the range of 0.05 – 4.4 pounds of $Na_2O \cdot Al_2O_3$ contained in solution.

5. The method of claim 4 in which the liquid sodium aluminate is injected into a stream of flue gas downstream of the economizer and upstream of the air heater present in a boiler installation.

6. Method according to claim 1 in which the liquid sodium aluminate is prepared by commencing with an aqueous solution of sodium aluminate, approximately 32–50% solids, and diluting that solution with an additional amount of water, up to 100 volumes of water.

7. Method according to claim 2 in which the liquid sodium aluminate is prepared by commencing with an aqueous solution of sodium aluminate, approximately 32–50% solids, and diluting that solution with an additional amount of water, up to 100 volumes of water.

8. Method according to claim 4 in which the liquid sodium aluminate is prepared by commencing with an aqueous solution of sodium aluminate, approximately 32–50% solids, and diluting that solution with an additional amount of water, up to 100 volumes of water.

* * * * *